(12) United States Patent
Brenner (10) Patent No.: US 7,793,211 B2
(45) Date of Patent: Sep. 7, 2010

(54) METHOD FOR DELIVERING TARGETED WEB ADVERTISEMENTS AND USER ANNOTATIONS TO A WEB PAGE

(76) Inventor: Walter Brenner, 125A - 1030 Denman Street, S402, Vancouver, BC (CA) V6G 2M6

( * ) Notice: Subject to any disclaimer, the term of this patent is extended or adjusted under 35 U.S.C. 154(b) by 955 days.

(21) Appl. No.: 11/511,011

(22) Filed: Aug. 28, 2006

(65) Prior Publication Data

US 2008/0052156 A1 Feb. 28, 2008

(51) Int. Cl.
*G06F 17/00* (2006.01)
*G06Q 30/00* (2006.01)

(52) U.S. Cl. ..................... 715/230; 705/14.4

(58) Field of Classification Search ................ 715/230, 715/232, 233, 273; 705/14.4, 14.49
See application file for complete search history.

(56) References Cited

U.S. PATENT DOCUMENTS

| | | | |
|---|---|---|---|
| 6,460,036 B1 * | 10/2002 | Herz ................................. | 1/1 |
| 6,581,061 B2 | 6/2003 | Graham ....................... | 707/10 |
| 7,483,871 B2 * | 1/2009 | Herz ................................. | 1/1 |
| 2002/0040311 A1 | 4/2002 | Douglass et al. ............... | 705/7 |
| 2003/0037041 A1 * | 2/2003 | Hertz ............................ | 707/1 |
| 2003/0085927 A1 | 5/2003 | Muller ....................... | 715/810 |
| 2004/0049419 A1 * | 3/2004 | Knight ....................... | 705/14 |
| 2004/0143590 A1 * | 7/2004 | Wong et al. ................. | 707/102 |
| 2005/0169558 A1 * | 8/2005 | Dance et al. ................. | 382/305 |
| 2006/0061595 A1 * | 3/2006 | Goede et al. ................. | 345/619 |
| 2007/0112714 A1 * | 5/2007 | Fairweather ................. | 706/46 |
| 2007/0276928 A1 * | 11/2007 | Rhoads et al. .............. | 709/219 |
| 2008/0255915 A1 * | 10/2008 | Collins et al. ................. | 705/8 |

OTHER PUBLICATIONS

YAHOO Local Web Page, 9 pgs. printed Dec. 6, 2005, showing a 5 star rating system and user review and comment section.

IMDb Web page for an internet movie database, 3 pgs. printed Jan. 24, 2006, showing an advanced form of rating and discussion of topics, with ratings on a 10 star scale, the ability to write reviews, links to Amzon dvd for sale, and message boards for comments and questions posted to other users.

YAHOO My Web printout, 2 pgs. printed Dec. 13, 2005, showing a web page that allows the user to right click and save a web page to My Web, uploading the data from the browser to a database run by Yahoo. The similarities are the that the URL is indexed, and users can add their own notes to the page and meta tags. Access levels can be defined to the data stored in Yahoo's My Web.

(Continued)

*Primary Examiner*—Laurie Ries
(74) *Attorney, Agent, or Firm*—Peter S. Canelias (57) ABSTRACT

The invention is a method for delivering targeted web advertising to internet users via a network capable of rating, annotating, linking, meta-tagging and otherwise annotating any definable data accessible through a global computer network. The system is comprised of a graphical user interface (GUI), a database, and software to connect the two. The system stores and caches data and related annotations in a database. The software searches and organizes the database inputs. The GUI displays the result to the user. The user, through a web-browser or other means, would access a definable set of internet data (e.g., a web page) and through the proposed system be able to view ratings of that data as well as other relevant inputs from other users.

13 Claims, 7 Drawing Sheets

OTHER PUBLICATIONS

YAHOO 360 web page printout, 17 pgs. printed Dec. 26, 2005, showing a service that aggregates content, that allows a user to blog, instant message, upload photos, rate and review local businesses, link to friends, initiate a music or news stream feed download, and list items and groups.

Flickr.com web page printout, 4 pgs. printed Nov. 27, 2005, showing a photo-sharing site. The pertinent aspects are the addition of meta-tags which are searchable, pictures being difficult to search by relying on word searching, and may not be searchable at all if the file is in a graphic, non-searchable text format. The sites allows notations in the picture, allowing the user to annotate the photo.

* cited by examiner

METHOD FOR DELIVERING TARGETED WEB ADVERTISEMENTS AND USER ANNOTATIONS TO A WEB PAGE

BACKGROUND OF THE INVENTION

The invention relates to the tagging and rating of web pages. More specifically, the invention allows the viewer to tag, rate or otherwise annotate a web page without leaving the subject web page.

A web site is a source of stored or dynamically generated web pages. Web pages consist of ascii text and are expressed in formal languages such as HyperText Markup Language (HTML) (or possibly eXtensible Markup Language (XML)). Web pages are usually sent from one machine (the server) to another (the client). The two machines may be the same, but ordinarily they are separate machines that communicate via a network.

The term "server" can mean both the physical machine that is sending web pages, and the software on the machine that responds to requests for web pages. Where it is necessary to distinguish, the term "web server" is used herein for the former.

The client requests a web page from the server using a Universal Resource Locator (URL) or web address. A URL has three parts: the protocol by which the client wants to talk to the server, the name of the server, and a third part, which is called the "request", that indicates what the client wants the server to send it. The prefix "http" indicates the protocol the client uses to send the request to the server; www.seashellsoftheworld.com is the name of the server to which the request is to be sent; and "dr.seymoreshmithtreatise-conshofFlorida.html" is the request that is to be sent to the server. Most servers would interpret "dr.seymoreshmith-treatise-conshofSFlorida.html" as a request for an html file stored on disk, and would respond by reading the file and sending it to the client.

A web page usually contains some amount of text plus html operators specifying how to display the page on the screen. The client software (e.g. a web browser, here preferably Microsoft® Explorer) has considerable leeway in deciding how to display the page to the user. The aspect of the display of web pages relevant to the invention is the display of links and forms.

A wireless communication system allows mobile users to access a resource from a content server. The wireless communication system includes a browser that allows mobile users to access resources through a wireless application protocol (WAP) compliant server. The (WAP) compliant server connects the browser to a content server. This connection allows resources to be passed between the browser and the (WAP) compliant server. As used herein, "internet" and "web page" include WAP compliant access methods. The browser is further configured to transmit a request that includes an address for a resource, a protocol to be used, and one or more textual parameters encoded into a binary data packet. The wireless communication method includes generating a request for a resource; translating a textual portion of that request into binary data at the browser; transmitting the request to a wireless gateway; and converting the request into a format that is compatible with a protocol used by a receiving network.

A link is usually a combination of text and/or an image, plus a URL. Typical client software will display the text or image with an underline or outline, or some other indication that the text is active. The user can indicate that he wants to follow that link, usually by clicking on it with a mouse. Herein the phrase "to click on a link" refers to a general term to mean whatever method the user uses to indicate that he wants to follow a link.

When the user clicks on a link, the request in the associated URL is sent to the web server mentioned in that URL. Usually the request will cause the server to send the client another web page, which will in turn contain other links, resulting in an ongoing series of requests from the client interleaved with web pages sent in reply by the server(s).

A form is like a link in that it includes places (i.e. "buttons") where the user can click to send a request to a server, but it can also include "fields", through which the user can send additional information along with the request. For example, a form field might be a menu of choices, a box in which the user can type text, or a button that the user can toggle on or off.

Client software is capable of browsing a conventional web site, meaning that the software is able to: (1) display web pages in some form to the user; (2) display links so that the user can click on them to send the corresponding request to the server named in the URL; (3) display forms so that the user can enter information into each field, and click on some button to send the corresponding request, plus the information entered by the user, to the server named in the URL; and (4) carry on an ongoing dialogue with a server, where requests from the client alternate with web pages from the server.

The term "link" includes both links and forms, along with any other element of a web page that has an associated URL, and which a user can click on to send the request in the URL to the server mentioned there.

Two elements are required to publish web pages on a global computer network such as the Internet or on an intranet: (1) an authoring tool: software for creating and maintaining the web pages; and (2) a server: a computer that can send (or "serve") the web pages to clients who request them. To avoid the expense and difficulty of maintaining their own web servers, users often share servers maintained by someone else. On the Internet, a company that maintains a web server shared by multiple users is called a hosting service. Within a corporate network, a server maintained by the MIS department might play the role of a hosting service for users within the company.

Systems exist that allow tagging and saving of web pages though lacking the critical feature of the present invention. For example, the My Yahoo page has a method for users to save and tag web pages, sharing them with defined groups or with everyone (universal unrestricted). The My Yahoo system, however, requires the user to go over to the Yahoo system and search that system using the Yahoo search engine for the desired content. In other words, the Yahoo system is proprietary, i.e., closed. The system deployed under the name Googlebase is similar in function to the system of Yahoo, and shares the same deficiencies. In contrast, the present invention works without leaving the subject page. This is especially important with regard to the user input rating and linking system, which is completely different than the Yahoo or Googlebase methods.

Another example is found in U.S. Pat. No. 6,581,061 to Graham, which is directed to a remote web site authoring system located on a server in communication with one or more clients via a network with in a distributed computing environment. The system provides a what-you-see-is-what-you-get (WYSIWYG) interface program that enables the client to edit a web page within a web site maintained on the remote server while concurrently viewing a replica of that web page. The system of Graham dynamically generates the replica of the web page while the client is editing the web page. The system combines the two elements of remote authoring, i.e., editing the web site and viewing the web site, enabling the user to view a replica of the web site during the editing process. The purpose of this system is to allow an authorized web master to remotely edit and permanently change his or her own material. In contrast, the present invention is for use by third party users, allowing them to add content and interact with data objects while not being allowed to alter their original form, and to receive targeted advertisements.

BRIEF SUMMARY OF THE INVENTION

The invention is a method for delivering targeted web advertising to internet users via a network capable of rating, annotating, linking, meta-tagging and otherwise annotating any definable data accessible through a global computer network. The system is comprised of a graphical user interface (GUI), a database, and software to connect the two. The database stores and caches the data and all related annotations. The software searches and organizes the database inputs. The GUI then displays the result to the user. The process allows a user to access a web page or similar data object, annotate the page, and have the page cached to allow subsequent users to view the annotations within the web page itself.

The present system preferably would have hierarchical filters: for example if a user wanted to see only comments by registered users or users from a specific institution (e.g., Boston University). Value added paid only subscriptions enabling more storage space and fewer advertisements would also be contemplated for use with the present method. Add on features such as the ability to open an IRC chat window with other users while all of the users are on the web page is also envisioned, although this feature is not believed to be critical or necessary to patentability.

The user, through a web-browser or other means, would access a definable set of internet (including a WAP environment) data, (e.g., a web page) and through the proposed system be able to view ratings of that data as well as other relevant inputs from other users. The phrase "data object" is herein defined as is the form of data that the present invention keys off of, such as a URL, a jpeg image, a wav file, an mpg file, GPS coordinates, and other accessible data formats.

As an example of a common form of URL: www.sheashellsoftheworld.com/dr.seymoresmithtreatise-conshsof-S.Forida.html. In this URL, "http" indicates the protocol the client uses to send the request to the server.

3.5 stars all users, 26 votes 4.5 stars reg. users & votes

Reviews/links/[search/add]

1 reg. user also viewing—click to communicate

In addition, hyper links, meta tags, etc. can be embedded by multiple users on the pages without altering the original pages. Upon activation of the GUI, a targeted advertisement can also appear. For example, using the URL cited above, a targeted advertisement for the site seashellcity.com would appear, a site selling exotic shells.

Another way of accessing the system is by highlighting data and querying the system. For example: highlighting dr.j.smith@harvard.com would bring up similar ratings, comments and links about this individual.

The proposed system preferably would have hierarchical filters: for example if a user wanted to see only comments submitted by registered users or those users from Boston University or particular institution or affiliation. Value added paid only subscriptions enabling more storage space and fewer advertisements preferably would also be envisioned in this system. Add on features such as the ability to open an IRC chat window with other users while each of the users are viewing the same web page is also envisioned.

The utility of the present invention is apparent, particularly when compared with prior systems and methods. The basic premise of the invention is to allow the average user immediate access to give feedback on a web page or defined web object such as a particular product or person. A defined web object can even be a global positioning system (GPS) location; for example, with a wireless device a user could enter a current GPS location automatically and receive or submit reviews of the business establishment (e.g., a restaurant, retail store, or other establishment commonly rated or reviewed) at the GPS location.

The benefits of the method inure to the individual user, allowing individuals to give feedback based on their interest in a given web page, web site or subject matter. Benefits to the business entity employing the method include delivering targeted advertisements based on the user's interest and query of the system.

Other benefits of the present invention are that the system allows the user to input annotations, in a structured but not restricted way. For example, the user has the functionality of an online rating system, but is not restricted to particular subject matter (in contrast to subject-specific rating systems such as automobile ratings) or to a particular database or proprietary system (in contrast to the Microsoft network or the Yahoo local ratings system). Secondly the system allows for greater interaction among users with common interests—such as accessing or viewing the same site or reading the same PhD thesis online. Also envisioned: running polls and odds calculators also (not certain if this should go in)

Users who would particularly benefit from the present invention include academic personnel such as teachers, instructors and professors, and their students, who could "note up" or otherwise annotate web page essays in much the same way as a word processing program such as Microsoft Word does for text documents. The invention would be even more advantageous than standard word processing annotation, however, because the system links to any annotations of whatever type without having to access the original page code (for example a link to an mpeg video on the rare pink conch sea shell added to Dr. Smith's essay).

Other objects and advantages will be more fully apparent from the following disclosure and appended claims.

BRIEF DESCRIPTION OF THE DRAWINGS

The above-mentioned and other features and objects of this invention and the manner of obtaining them will become apparent and the invention itself will be best understood by reference to the following description of an embodiment of the invention taken in conjunction with the accompanying drawings, wherein.

DETAILED DESCRIPTION

The present invention is comprised of a graphical user interface (GUI), a database, and software to connect the GUI and the database. The database stores and caches data and related web page annotations in memory. The database is also a means for storing and caching data and related alterations. The software searches and organizes the database inputs, and causes the GUI to display the result to the user as the user is viewing the subject web page.

Figure 1:
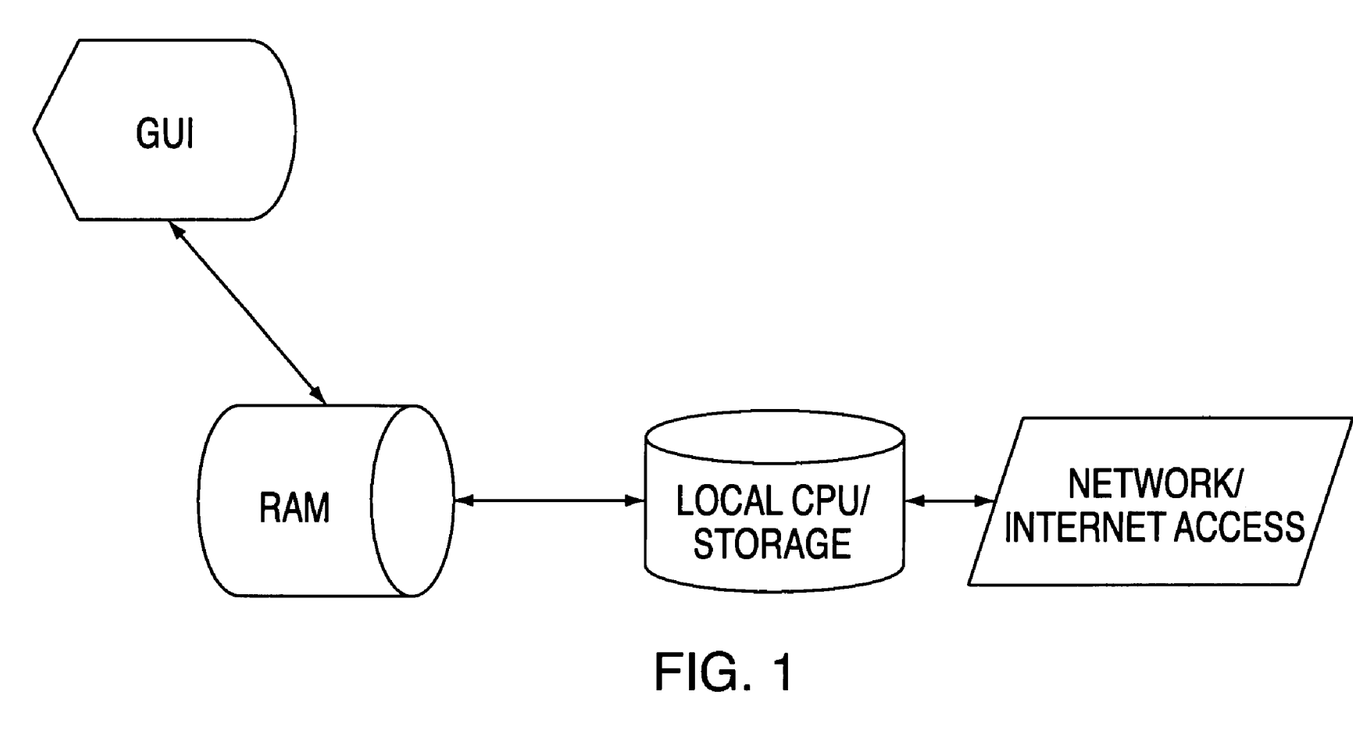
FIG. 1 is block diagram showing the basic architecture of the invention.

As shown in FIG. 1, the overall architecture of the present invention includes a Graphical User Interface (GUI) to allow the user to access a global computer network and the present invention, preferably a version of Microsoft® Explorer. The user, through the GUI, selects data as a work piece for the invention; if the user does not make a selection, the default data such as the URL become the input. The GUI is in operable engagement with a memory storage device, here shown as random access memory (RAM), which in turn is in operable engagement with a local central processing unit (CPU) which contains a local storage medium or media, such as a hard disk drive. The local CPU is in operable engagement with a global computer network such as the Internet, and may access the Internet via a network.

A user may request data through a global computer network or intranet, which provides a subject web page for viewing. Regardless of the method used to retrieve the data, the data, including user-added annotations, will be stored as a file in the cache.

Figure 2:
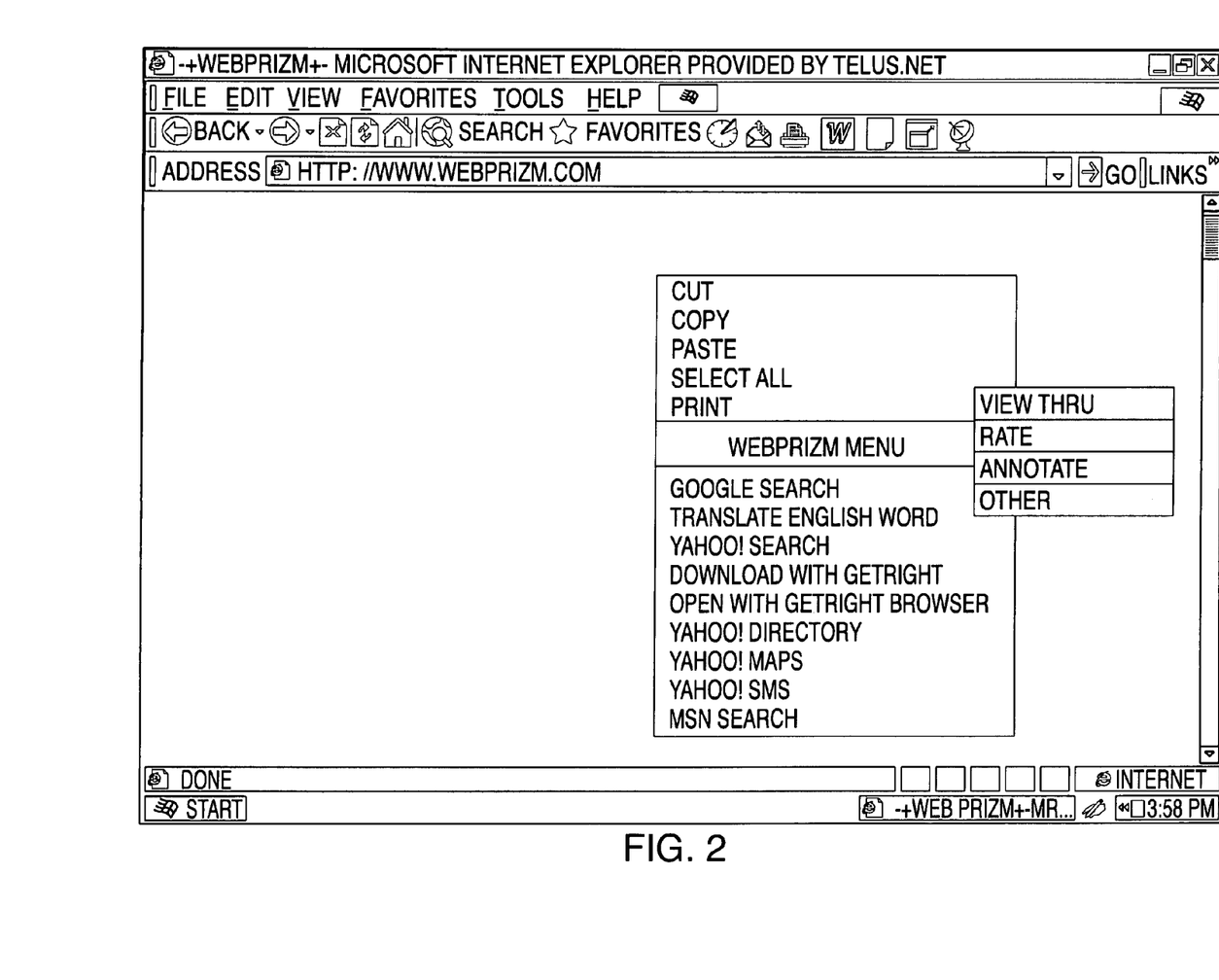
FIG. 2 is a screen shot of a web browser with used with the invention.

FIG. 2 shows the image of a display screen of a web browser, here shown as the preferred Microsoft® Explorer. A right-click on the webprizm.com link displays the webprizm.com menu selections. A user may select from among VIEW THRU, RATE, ANNOTATE, and OTHER.

Figure 3:
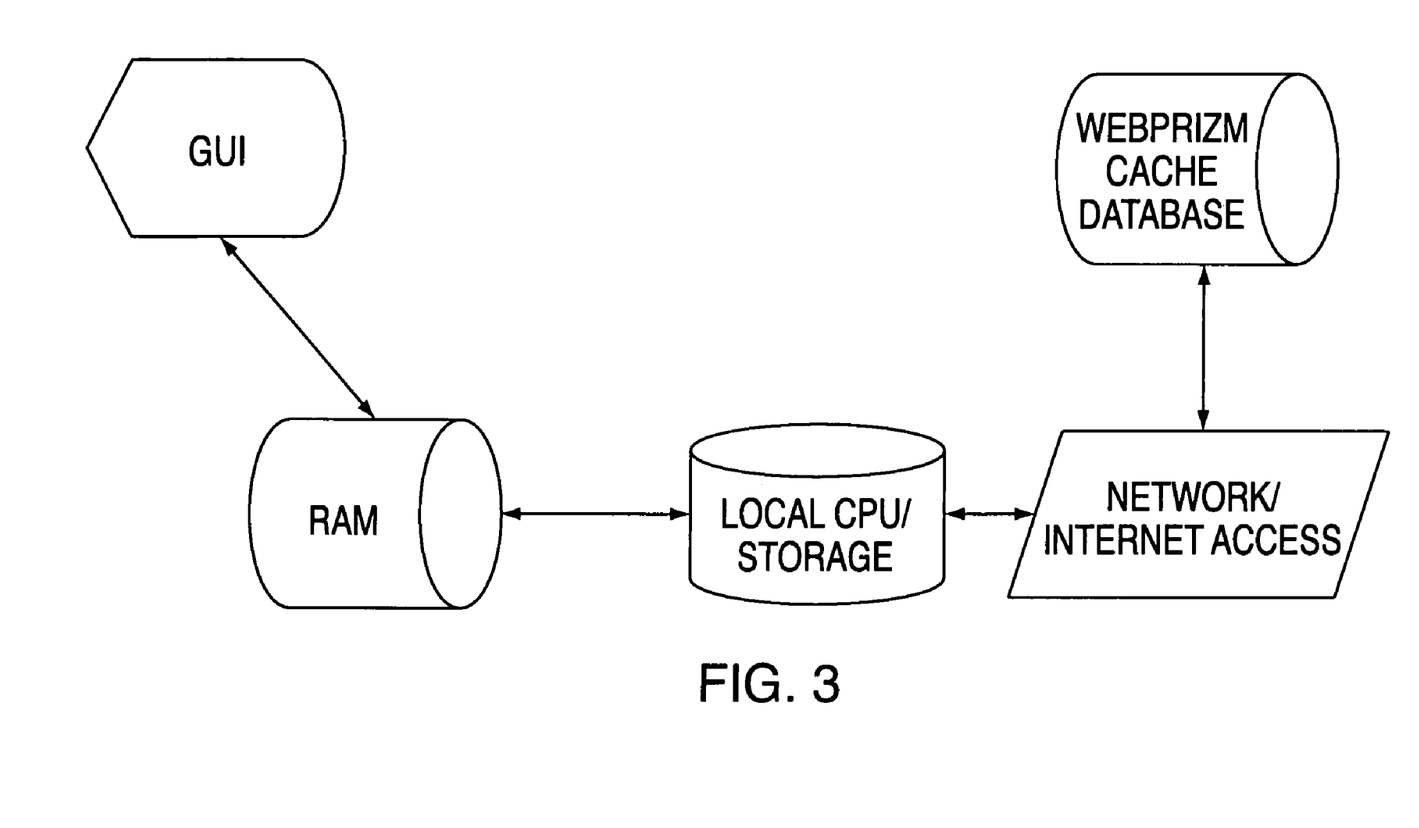
FIG. 3 is a block diagram showing the cache database used with the invention for selecting options.
Figure 4:
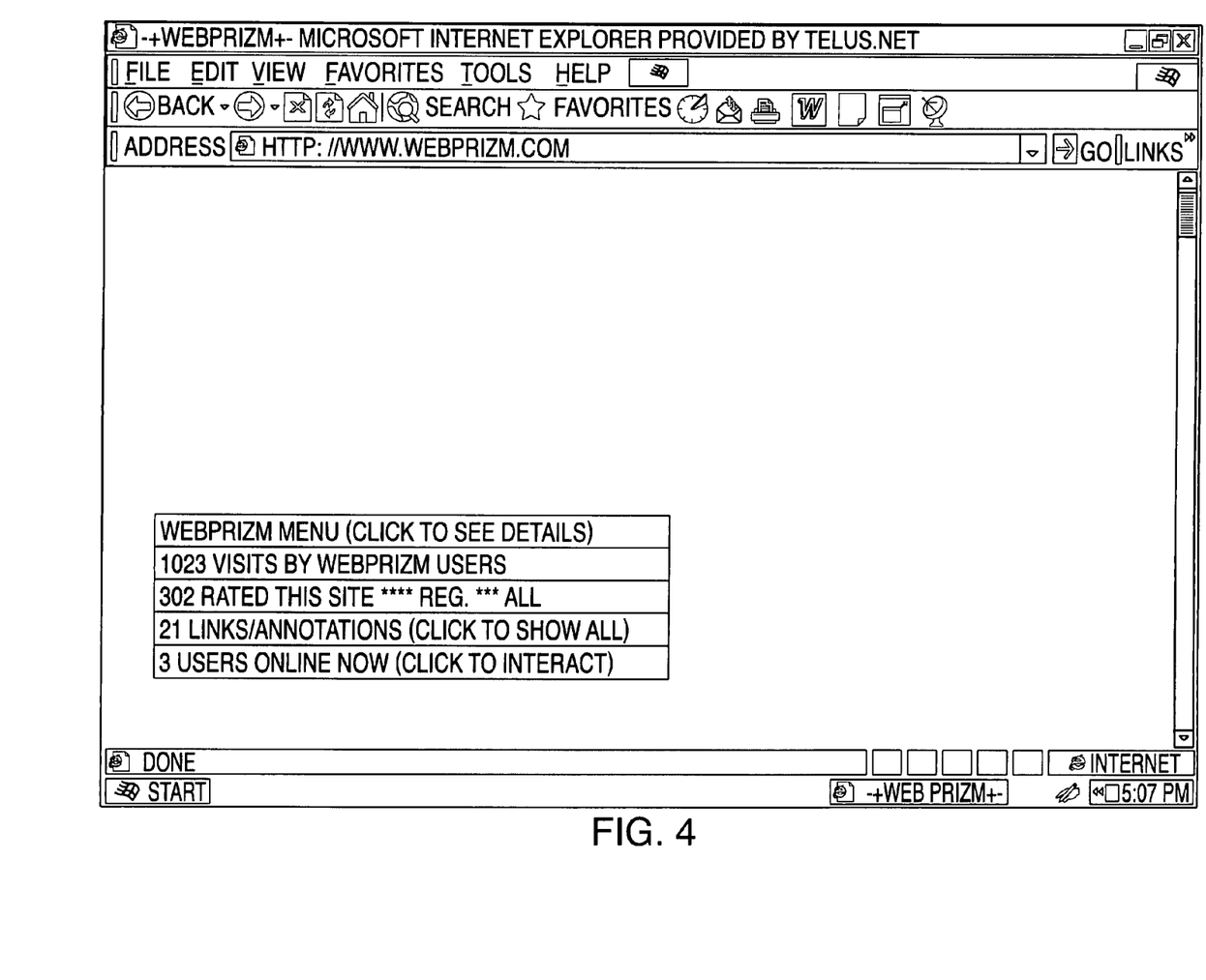
FIG. 4 is a screen shot showing a web browser with a VIEW THRU option.

FIG. 3 is a block diagram showing the cache database used with the system and method for selecting from the options presented in FIG. 2. The cache database (here labeled Webprizm cache database) stores both the data and user-added annotations associated with the subject web page. The user selects the option VIEW THRU from the menu, and a typical web browser screen display in the GUI is shown in FIG. 4. The VIEW THRU option allows the user to view summaries of several categories of stored information. The categories shown are (1) number of visits by webprizm users; (2) number of user ratings (with subcategories for registered users and all users); (3) number of links/annotations, viewable though a hyperlink; and (4) number of users online at the time, with an option to interact with the users then currently online.

Figure 5:
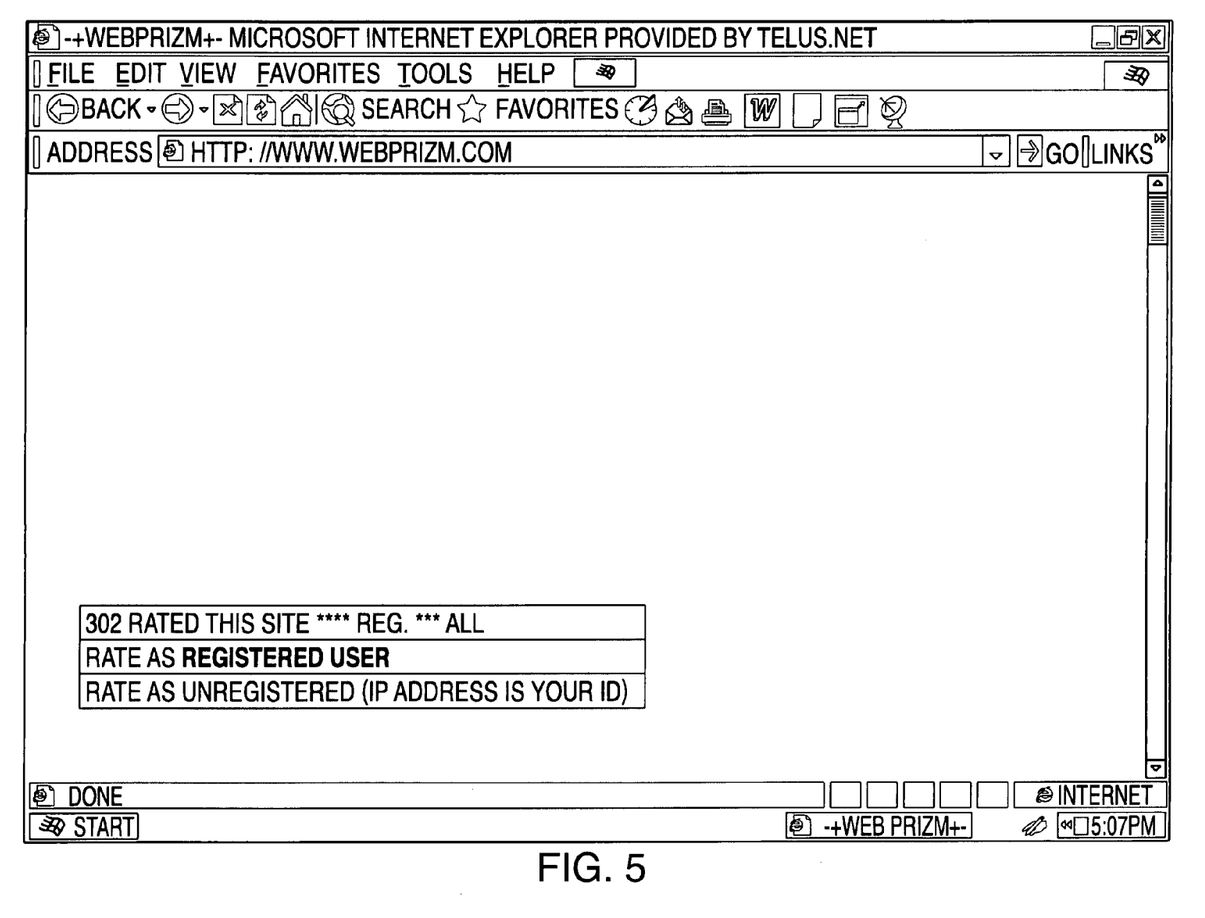
FIG. 5 is a screen shot showing a RATE selection.

FIG. 5 is a display image showing the user's selection of the RATE from the menu options. The number of user ratings (with subcategories for registered users and all users) is displayed, along with two options for the user to rate the site; as a registered user or as an unregistered user, the unregistered user selection using the IP address as the identification.

Figure 6:
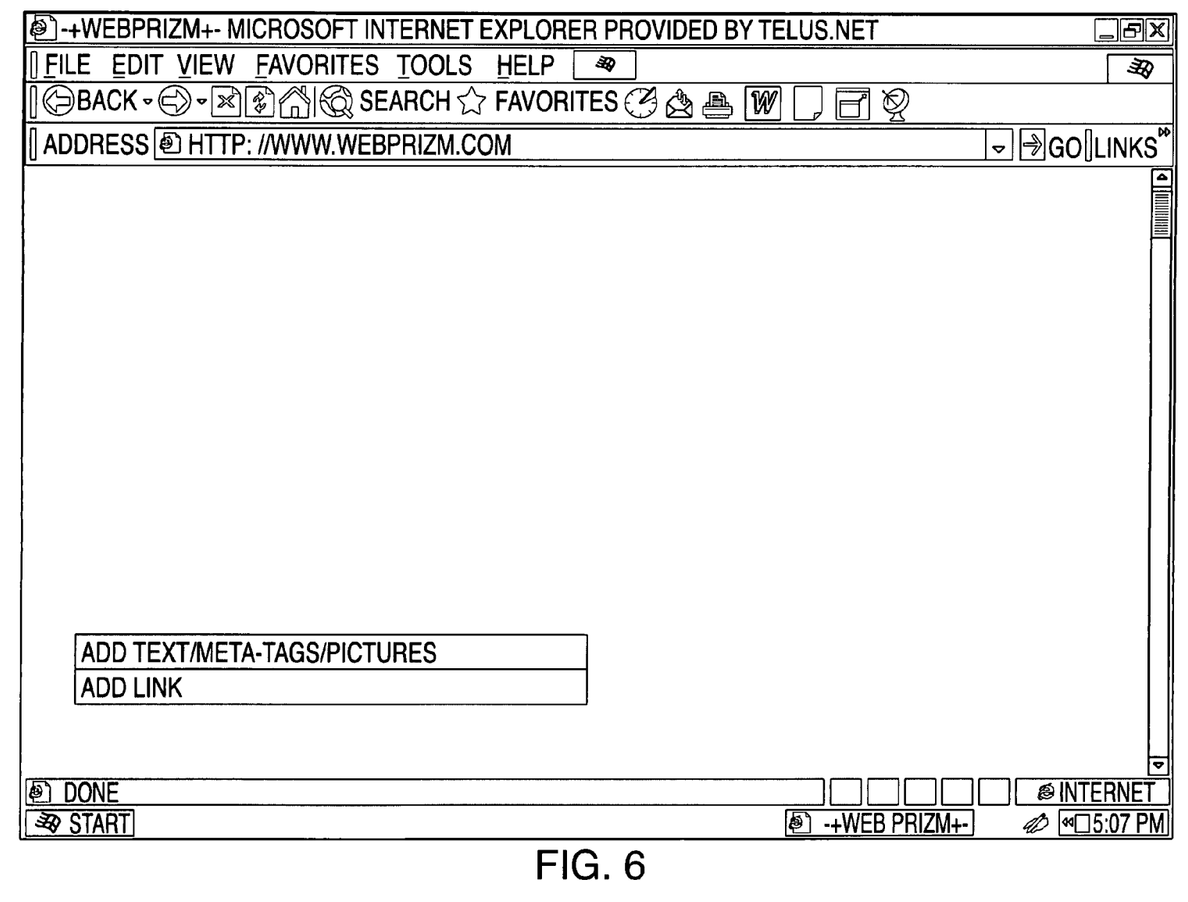
FIG. 6 is a screen shot showing an ANNOTATE selection.

FIG. 6 is a display image showing an ANNOTATE selection from the menu. Two options are shown within the ANNOTATE selection; an "add text/meta-tags/pictures option, for users to annotate with one or more of these types of data, and an "add link" option for adding a link to other material or data.

Figure 7:
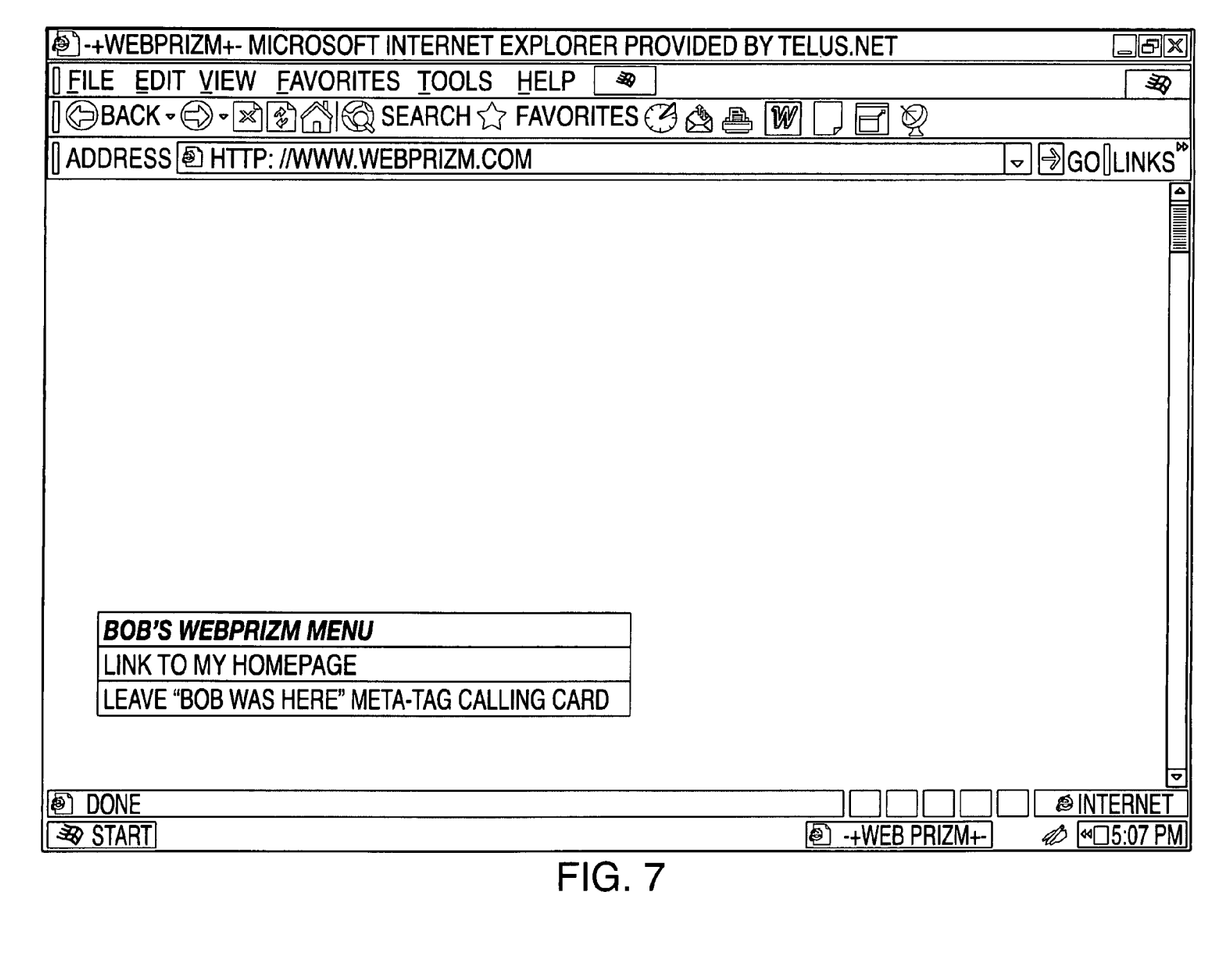
FIG. 7 is a screen shot showing OTHER options.

FIG. 7 is a screen shot showing OTHER options. The OTHER options preferably are user-defined from a set-up menu or programmed by the user. The OTHER options can be individualized to the particular user, shown in FIG. 7 as "Bob's webprizm menu". The options programmed here are typical of the user-programmed or user-defined selections, such as "link to my homepage" or to leave a "Bob was here" meta-tag calling card.

A preferred embodiment of the present invention is referred to as "webprizm.com" as shown in the drawings, and is illustrated herein by the actions and process steps of two users, denoted as A and B. User "A" is browsing and desires to use the webprizm.com ("WP") software. The software has a "download" function where a zipped packet or similar method is used to deliver the resident software to User A's computer. As with e-mail, web-based applications of Webprizm are possible and detailed hereafter, but would follow the same steps except for downloading software locally to a user's computer or computer memory.

User A installs the WP software as an add-on to his web browser. In this example, the WP software's functions must be compatible with the Internet Explorer browser to slot into the Tools-add-on menu. Service providers such as MSN, Google and Yahoo all have multiple add-ons listed under a typical tools menu in Internet Explorer.

User A is browsing the web page "conchshells.tv", and desires to employ the WP system to rate this web site. User A "right clicks" on the selection menu as illustrated in FIG. 2. The add-on WP software now enables an option on the "right click" menu in the browser, and displays the following selections:

VIEW THRU (FIG. 4);

RATE (FIG. 5);

ANNOTATE (FIG. 6) (submenu: add-text/meta-tags/pictures/links); and

OTHER (FIG. 7) (submenu: Check for other Users, register as user, report abuse, user defined functions etc). User defined functions such as "Bob was here" provide one click calling cards allowing others to know he was there.

User A selects "Rate" from the menu, as shown in FIG. 5. The resident client WP software connects with the WP server letting the server know that someone wants to input data. The client software defines the Data Object (what is being rated, commented on etc.). In this case, since no sub-selection is made, the default DO definition is the url: www.conchshells.tv/home. At this point, User A may receive a targeted advertisement. Assuming someone has requested to sponsor the ad word (phrase) "conch shells" or a related subject, a relational database recognizes the association of the Data Object with an ad topic which has been purchased by the advertiser or sponsor, and sends from the WP server to User A's browser a popup for "Bahamian Tourism" or similarly targeted ad. Typically, ads are paid on "impressions" or click thru.

User A selects 4/5 stars to rate the site. The input fields would be: www.conchshells.tv/home (the Data Object) caches.

4/5 stars;

IP address of User A (if not registered user);

time (00:12:43 GMT).

The caching of the page is similar to that used by search engines, saving the content of the page to a disk.

User A then wants to add a textual comment onto the page, selecting "annotate" and sub-selecting "text" from the menu: Annotate (submenu: add-text/meta-tags/pictures) and typing in the comment: "This site is cool". User A then selects Annotate—add text. As with the rating option, the input is captured and matched with the Data Object in the relational database. Fields:

DO www.conchshells.tv/home (checked against cached);

text: "This site is cool";

IP address of User A (if not registered user);

time (00:12:44 GMT).

In this case the WP software would not have to re-cache the page, but would merely check it's existing cache against the current "live" web page of www.conchshells.tv/home. At this point, a targeted ad may be delivered to User A, preferably a pop-up ad to User A based on the nature of the Data Object.

Reading through the site, User A finds a thesis statement written by a third party (here named Roger) that he does not agree with. Highlighting the statement, with the cursor in the browser, he then right clicks on Annotate again, and types the comment "This is totally wrong: see Floyd, 1976 "Conchs of the upper Mississippi". In this case, the Data Object is defined by the client software as a subset of www.conchshells.tv/thesis/roger/p01.html. The phrase that User A has highlighted is "Conch shells only thrive in salty water". The software steps are exactly the same except the annotation is specific to one section of the above webpage. The Data Object field in this case is: www.conchshells.tv/thesis/roger/p01.html [begin subset] "Conch shells only thrive in salty water"[end]. The Annotation input field is: "This is totally wrong: see Floyd, 1976 "Conchs of the upper Mississippi". One aspect of highlighting and annotating in this way is that it would be possible for the defined data object to be searched through webprizm.com no matter where the data object was located.

In the given example, it's unlikely the Data Object phrase would appear in many places but, if some one else highlighted the same phrase "Conch shells only thrive in salty water" and it was sent by client software to the WP main server, the other user would be made aware of the annotation of User A.

Another example is a toy for sale on the Internet "Flying Gizmo". A WP software user Annotates Data Object with "This thing is poorly made—never worked right". Any user on any site highlighting "Flying Gizmo" would have access to the comment through WP no matter where he or she was navigating (amazon.com or buyandsell.com). The software steps implemented are covered in User B's accessing of the input data later. But it is not complex, being a query of a relational database, and is known to those skilled in the art.

Again, at this point, a targeted ad may be delivered to User A, preferably a pop-up ad to User A based on the nature of the Data Object. "Push" pop up ads to a browser with client installed software is quite developed and any programmer of skill can implement this step.

Now, User A desires to link two pages together. User A selects "Link" from the WP menu, (Annotate (submenu: add-text/meta-tags/pictures/links)), and types in the desired link www.tastyconchrecipies.tv exactly as with annotation, etc. The WP software:

identifies the Data Object (conchshells.tv);

receives the input command "link" and the input www.tastyconchrecipies.tv;

WP software checks the cached page of conchshells.tv against its existing cache for changes;

records the link (along with user, time etc).

Preferably, the WP software would also cache the "linked to" page www.tastyconchrecivies.tv. The net effect of this is that, now, though the WP system, the two Data Objects (here web pages) are both cached and linked. If a user were to go to either of them, he could "see" the linkage (the software steps in viewing WP based data are below). And again, a targeted ad may be delivered to User A at this point, preferably a pop-up ad to User A based on the nature of the Data Object.

As to the tagging, the following is an example. User A sees a unique conch shell image (here in a .jpg format) on some page (bahamastourism.tv) and wants to let people know about it, even though the .jpg image is not labeled or otherwise indexed. While his cursor is on the picture, he right clicks, selects "Tag" and types in the tag field: "magnificent, striated, Bahamas conch, shell" [meta-tags separated by commas]. The WP software will then cache the .jpg image and the associated tags, location last found, etc. entering them into a relational database of non-text Data Objects. Once the .jpg (or .wav or .mpg) file is cached, the key to crosslinkages happens in the indexing function of the WP database of the user. Preferably (though not a system requirement) the WP system cross links and indexes keywords in the tags:

Conch-;

seashells/gastropods-marine biology;

Striated-ridgeline-texture-designs and shapes.

User A's tags are cross referenced with higher order categories. The initial tags entered by User A initials "ripple" through the relational database. This assists in the "decoding" of the large parts of the Internet which are non-textual and not adequately tagged so people can find what they are looking for. And again, at this point a targeted ad may be delivered to User A, preferably a pop-up ad to User A based on the nature of the Data Object, what is known about User A etc.

Turning to User B, assuming User B has downloaded and installed the WP software (or is on the web-based version of the system discussed below), User B browses over to www.conchshells.tv and wants to know if anyone else has been there, and if so what their thoughts and ideas were. She right clicks to obtain the main WP menu (FIG. 2):

VIEW THRU

RATE

ANNOTATE

OTHER (Check for other Users, register as user, report abuse, etc).

User B selects the VIEW THRU option from the menu, as shown in FIG. 4. User B's client software communicates to the WP server, indicating that User B is on the selected webpage and wants to view the web page through the WP system. The WP software identifies the Data Object that User B is referencing (by default, the web page she is on, in this case). If there are no existing inputs, WP returns "no data" or a similar message.

User B sees: Webprizm menu (click to see details);

visits by WP users;

ratings summary;

links/annotations bubble;

users online bubble.

The key to User's B's access is the definition of the Data Object (webpage, section of text, a song, a product) then the sending by the WP software of the query to the WP relational database and presentation of the ratings, annotations etc. relating to that Data Object. Preferably, exactly how the current page is different from the cached page would be displayed.

At this point, a targeted ad may be delivered to User B, preferably a pop-up ad to User B based on the nature of the Data Object and other details known about User B. User B clicks on the "annotations" bubble (which references all annotations under the Data Object, here the web home page and any subsidiary Data Objects depending from it, such as the page www.conchshells.tv/thesis/roger/p01.html, which is in this domain). A menu of all annotations appears:

Main: "User B "this site is cool [date]";

Inside: "User B "this is totally wrong . . . [date]";

User B selects User B's "Inside" comment. Preferably, the system would allow for User B to see a menu of all inputs for the whole domain and be able to search/view them for relevancy. Some Data Objects, such as poplar sites, will have many inputs, and thus filters/search engines are necessary additions to deal with thousands of comments/annotations in order to derive the relevant ones. Preferably the menu of annotations, etc., would have a brief (one-line) hint as to what they are like, comprising the I.D. of the annotator and the first few words of the comment (in this case "User B 'This is totally wrong . . . '") and a time reference.

The WP software checks the cached version of Data Object against the one User B is viewing. If the page has changed, the cached page is displayed to User B (i.e.: the whole page with the text User A disagreed with highlighted and a bubble containing User A's comments on the passage in question) and a notation that 'this page has changed—cached page'. At this point, a targeted ad may be delivered to User B, preferably a pop-up ad to User B based on the nature of the Data Object.

For viewing Links and Tags: with Links, the WP user could view them from both "sides" i.e.: if User B is on "tastyconchrecipies.tv" she can see the link embedded by User A to "conchshells.tv" though User A need never have been to the tastyconchrecipies.tv site. So the linked-to site then becomes a "Data Object".

User B Checks for Other Users on the main WP menu: 2 users online now (click to interact). She clicks: Interacting with the browser address line, the WP system registers on what site each user is (if "tracking" is not disabled). Updating this information every few seconds or so, real time co-browsers can be seen in iconic form by User B. In this case the WP system returns:

"2 users:

1 Registered nickname conch-ranger@aol.com"

1 Unregistered user" are on the subject site.

"24 users on related sites"

User B may contact one or more of the other users by e-mail if the other user has registered his e-mail address, or through other system options. Because the WP system "sees" what site a user is on, it is possible to show who is on the same site or browsing in the same domain or a related (i.e., linked) domain.

Besides simple tracking software which is widely available, the ability to read details of fellow page browsers if they show such details, is exactly the same as seeing "ratings or annotations", in that the data is on the WP server and sent to the viewer. Preferably, one would be able to open a "chat" window of more or less sophistication (or bridge to MSN or Yahoo chat). This is a potential option for the present invention, not a central function, as IRC already exists in simple and advanced forms.

A web-based WP method is illustrated as follows. Instead of downloading the client program, the WP functions are manipulated through a GUI on the webprizm.com home page. In effect, the user would be browsing through the WP GUI. Software would have to provide a GIU on the website which matched the functions of the downloadable program. As with the e-mail system "Hotmail" as contrasted with Microsoft® Outlook, the functionality of a resident program can be duplicated without downloading software, with some compromises in speed and dexterity. This allows for use on public or borrowed computers as a "guest".

Other options include such functions as abuse monitoring, where a menu item is included such as "report abuse". This function could monitor and allow reporting of offensive content such as ethnic and racial slurs or obscene materials. Searchability can be provided as an open system to search engine crawler bots. As with "wikipedia" and other knowledge bases, value increases by allowing everyone to search and have access.

The system may also be provided with protection against mechanical inputs using standard and established software steps well known to those skilled in the art. For example spam sites creating false 5/5 star ratings for their products and can be screened on that basis.

For Data Objects which cannot be completely cached, the WP system uses "best possible" identifier and presents ratings, etc., in such a way as to preserve Data Object viewability—normally by overlaying the live page with the ratings and annotations—the user takes the risk that the underlying page of the Data Object may have changed since it is not cacheable.

The system allows users to edit their respective past inputs and postings, and is applicable to a wide range of Data Objects, which would include any identifiable input into a database.

Since other modifications or changes will be apparent to those skilled in the art, there have been described above the principles of this invention in connection with specific apparatus, it is to be clearly understood that this description is made only by way of example and not as a limitation to the scope of the invention.

What is claimed is:

1. A method for delivering targeted web advertising to users via a network capable of annotating a data object, comprising steps of:

accessing a data object with a selectable view-thru option;

displaying a visible portion of the data object as a display image;

making alterations to the data object, wherein at least one alteration includes a rating of the data object;

storing and caching the data object and the alterations in a database;

the data object and the alterations comprising database inputs;

searching and organizing the database inputs;

displaying a result to the user without migrating to another display, image wherein the result displayed includes an advertisement.

2. The method of claim 1, wherein the data object is web page.

3. The method of claim 1, wherein the data object is global positioning system location.

4. The method of claim 1, wherein the alteration is an annotation of the data object.

5. Recordable media having computer instructions for carrying out a method for delivering targeted web advertising to users via a network capable of annotating a data object, the recordable media comprising:

computer program code for accessing a data object with a selectable view-thru option;

computer program code for displaying a visible portion of the data object as a display image;

computer program code for making alterations to the data object, wherein at least one alteration includes a rating of the data object;

computer program code for storing and caching the data object and the alterations in a database, the data object and the alterations comprising database inputs;

computer program code for searching and organizing the database inputs;

computer program code for displaying a result to the user without migrating to another display image wherein the result displayed includes an advertisement.

6. The recordable media of claim 5, wherein the data object is web page.

7. The recordable media of claim 5, wherein the data object is global positioning system location.

8. The recordable media of claim 5, wherein the alteration is an annotation of the data object.

9. A computer system having recordable media including computer instructions for carrying out a method for delivering targeted web advertising to users via a network capable of annotating a data object, the computer system comprising:

computer program code for accessing a data object with a selectable view-thru option;

computer program code for displaying a visible portion of the data object as a display image;

computer program code for making alterations to the data object, wherein at least one alteration includes a rating of the data object;

means for storing and caching the data object and the alterations, the data object and the alterations comprising inputs;

computer program code for searching and organizing the inputs;

computer program code for displaying a result to the user without migrating to another display image wherein the result displayed includes an advertisement.

10. The computer system of claim 9, wherein the data object is web page.

11. The computer system of claim 9, wherein the data object is global positioning system location.

12. The computer system of claim 9, wherein the alteration is an annotation of the data object.

13. The computer system of claim 9, wherein the means for storing and caching the data object and the alterations comprises a database.

* * * * *